United States Patent

Schwab et al.

[11] Patent Number: 5,612,492
[45] Date of Patent: Mar. 18, 1997

[54] FORMULATIONS AND METHOD OF USE OF PRESSURE SENSITIVE PAINT

[75] Inventors: Scott D. Schwab, Richmond, Va.; Ram L. Levy, St. Louis, Mo.

[73] Assignee: McDonnell Douglas Corporation, Hazelwood, Mo.

[21] Appl. No.: 483,711

[22] Filed: Jun. 7, 1995

[51] Int. Cl.$^6$ .............................. G01M 9/00; G01L 9/00
[52] U.S. Cl. ................................................ 73/147; 73/705
[58] Field of Search ................ 73/147, 705; 252/301.34, 252/301.35

[56] References Cited

U.S. PATENT DOCUMENTS

| | | | |
|---|---|---|---|
| 5,162,407 | 11/1992 | Turner | 524/108 |
| 5,186,046 | 2/1993 | Gouterman et al. | 73/147 |
| 5,307,675 | 5/1994 | Mosharov et al. | 73/147 |
| 5,359,887 | 11/1994 | Schwab et al. | 73/147 |

*Primary Examiner*—Richard Chilcot
*Assistant Examiner*—Paul D. Amrozowicz
*Attorney, Agent, or Firm*—Timothy H. Courson, Esq.; J. Rick Tache, Esq.

[57] ABSTRACT

A pressure sensitive paint is coated onto the surface over which a pressure distribution is to be measured, such as in a wind-tunnel test of an aerodynamic body. A pressure sensitive paint is a mixture of a photoluminescent-compatible, oxygen-permeable binder that is a mixture of silanol-terminated polydimethylsiloxane and methyltriacetoxysilane, and a photoluminescent active agent such as tris(4,7-diphenyl-1,10-phenanthroline) ruthenium(II) chloride pentahydrate. The binder and active agent are placed into an appropriate amount of a solvent for the binder and the active agent, such as dichloromethane, and applied to a surface. In testing of the surface such as wind tunnel testing, the active agent quantitatively luminesces responsive to the local external pressure at the surface.

16 Claims, 2 Drawing Sheets

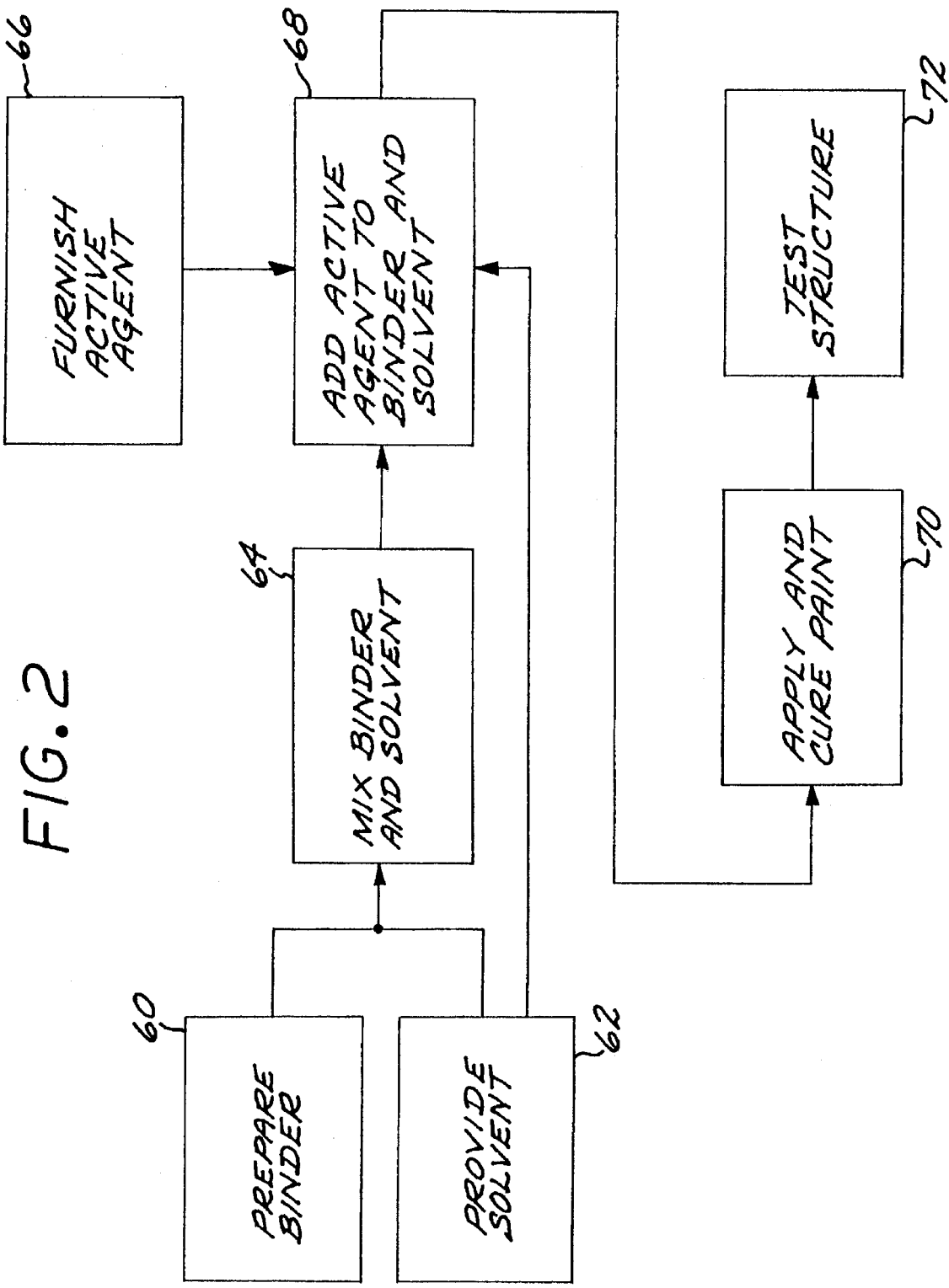

FORMULATIONS AND METHOD OF USE OF PRESSURE SENSITIVE PAINT

BACKGROUND OF THE INVENTION

This invention is related to photoluminescent, pressure sensitive paints, and, in particular, to such paints suitable for indicating pressure changes at the surface of an aerodynamic structure during wind-tunnel testing.

Aerodynamic structures such as aircraft and aircraft components are commonly tested in a wind tunnel to gather data for use in verification of characteristics and in design improvements. Various quantities are measured in the wind-tunnel testing, including, for example, the pressure distribution at the surface of the structure. The pressure information is used to calculate air flows and force/pressure distributions over the structure.

A number of techniques have been employed over the years to make the pressure measurements. Mechanical or electronic pressure sensors can be affixed to the external surface of the structure. Such sensors ordinarily have a portion extending above the surface into the airstream, which itself can alter the airstream and the measured values. The sensors ordinarily are relatively large in size, which limits the spatial resolution of the data that is gathered and also limits the number of sensors that can be employed. In another approach, small orifices are provided in the surface to act as pressure taps. The taps communicate at one end with the pressure at the surface of the structure and at the other end with a pressure transducer. If the structure under test is a subscale model, it is ordinarily quite difficult to use a large number of pressure taps due to the size of each tap and its pressure transducer. The spatial resolution of the measurements and the number of sensors that can be used is therefore limited. Lastly, models utilizing pressure taps are time consuming and expensive to build.

A more recently developed alternative approach is luminescence barometry, described, for example, in U.S. Pat. No. 5,359,887. In this technique, the surface of an aerodynamic structure is coated with a paint constituting a formulation of a binder and an active agent that emits light when excited by radiation of a particular type, such as ultraviolet or visible blue light. For some types of active agents, the presence of oxygen, such as found in the air, quenches or reduces the light emission. The extent of quenching is proportional to the partial pressure of the oxygen, or, stated conversely, the light output of the active agent is inversely proportional to the partial pressure of the oxygen. The binder is selected to hold the paint in place on the surface of the aerodynamic structure, yet permit the oxygen in the atmosphere to permeate therethrough and reach the active agent to perform the quenching function.

The higher the pressure of oxygen in the atmosphere contacting the luminescent paint, the lower the light emission of the paint. The intensity of light emission of the paint is therefore a useful measure of the local oxygen partial pressure, and thence the total local air pressure, of the atmosphere in contact with the paint. The light intensity is measured optically, so that the limit of spatial resolution is typically determined by the spatial resolution of the optical system. Thus, the aerodynamic structure is effectively "instrumented" for wind-tunnel pressure testing by painting the structure with the pressure-sensitive paint, illuminating the structure with the required wavelength of radiation, and measuring the luminescence and light output intensities over the surface of the model using an optical imaging system.

Although the existing paints are operable, there is an ongoing need for a paint formulation that is more sensitive to pressure change, is durable, and is easily applied to produce a smooth surface on the aerodynamic structure. The present invention fulfills this need, and further provides related advantages.

SUMMARY OF THE INVENTION

The present invention provides a pressure-sensitive paint for use in luminescence barometry, which has improved sensitivity, durability, and application properties as compared with prior paints. When applied to the aerodynamic surface, the paint is very smooth, so that it does not itself interfere with the air flow past the surface. The paint adheres well to the surface during the course of extensive testing in a wind tunnel. The paint allows pressure changes as small as about 0.1–0.2 pounds per square inch to be measured, when the paint is used in conjunction with a high-quality optical imaging system such as one using a CCD (charge coupled device) camera sensor.

In accordance with the invention, a pressure sensitive paint comprises in combination a formulation of a photoluminescent-compatible binder comprising a formulation of silanol-terminated polydimethylsiloxane and methyltriacetoxysilane, and a photoluminescent active agent. Preferred examples of operable active agents include tris(4,7-diphenyl-1,10-phenanthroline) ruthenium(II) chloride pentahydrate, tris(4,7-diphenyl-1,10-phenanthroline) ruthenium(II) perchlorate pentahydrate, and tris(3,4,7,8)tetramethyl-1,10 phenanthroline) ruthenium(II) chloride hexahydrate. To apply the paint, these components are dissolved in an operable amount of an organic solvent such as dichloromethane to disperse the active agent in the binder and to permit application to a surface by a selected technique such as spraying.

A related method of conducting a wind-tunnel surface pressure distribution examination of a surface comprises the steps of applying to the surface of a test model a paint formulation of the type described above, curing the binder on the surface, photoexciting the paint on the coated surface while air flows over the surface, and measuring the luminescence emitted from the paint.

The composition of the binder is a key feature of the present invention. The binder is of a composition specially prepared to enhance the sensitivity, durability, surface smoothness, and applicability of the paint. The binder maintains the molecules of the active agent in a dispersed state whereby each active molecule is surrounded by the binder molecules. The sensitivity of the paint to pressure changes is enhanced by this morphology. The binder is a specific silicone rubber that is permeable to atmospheric oxygen to permit the quenching of the active agent, and this excellent permeability is important in achieving good sensitivity of the pressure-sensitive paint.

The silanol-terminated polydimethylsiloxane is present in an amount of from about 96 to about 97.5 percent by weight of the binder, and the methyltriacetoxysilane is present in an amount of from about 4 to about 2.5 percent by weight of the binder. In a most preferred formulation, the silanol-terminated polydimethylsiloxane is present in an amount of about 97 percent by weight of the binder, and the methyltriacetoxysilane is present in an amount of about 3 percent by weight of the binder.

The binder, in turn, is present in an amount of from about 99.5 to about 99.9 percent by weight of the total of binder and active agent, and the active agent is present in an amount of from about 0.5 to about 0.1 percent by weight of the total of binder and active agent. In a preferred case, the binder is present in an amount of about 99.7 percent by weight of the total of binder and active agent, and the active agent is present in an amount of about 0.3 percent by weight of the total of binder and active agent.

During the application procedure a volatile organic solvent such as dichloromethane is provided to dissolve the binder and the active agent. The preferred proportion is from about 70 to about 90 percent by weight of organic solvent (of the total weight of solvent, binder, and active agent) and about 30 to about 10 percent by weight of the combination of binder and active agent. Most preferably, the organic solvent is present in an amount of about 80 percent by weight, and the combination of binder and active agent is present in an amount of about 20 percent by weight. After the paint is applied to a surface, the organic solvent vaporizes as the paint dries and cures.

The formulation of binder, active agent, and solvent is applied to the surface whose pressure distribution is to be measured by any suitable photoluminescence technique for optical surface pressure determination. Spray application, as with an airbrush, has been found particularly effective. The layer of the paint formulation applied to the surface is dried to remove the solvent and cured, so that the layer adheres tightly to the surface. The cured layer comprising the binder and active agent is controllably thin. It does not substantially alter the dimensions of the aerodynamic structure in most cases. The cured paint luminesces when illuminated by ultraviolet or visible blue light, and the luminescence is quenched by oxygen to a degree that is approximately inversely proportional to the partial pressure of the atmosphere contacting the surface following the Sterm-Volmer relationship.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 2 is a process flow diagram for the testing of an aerodynamic model using the pressure-sensitive paint.

DETAILED DESCRIPTION OF THE INVENTION

Figure 1:
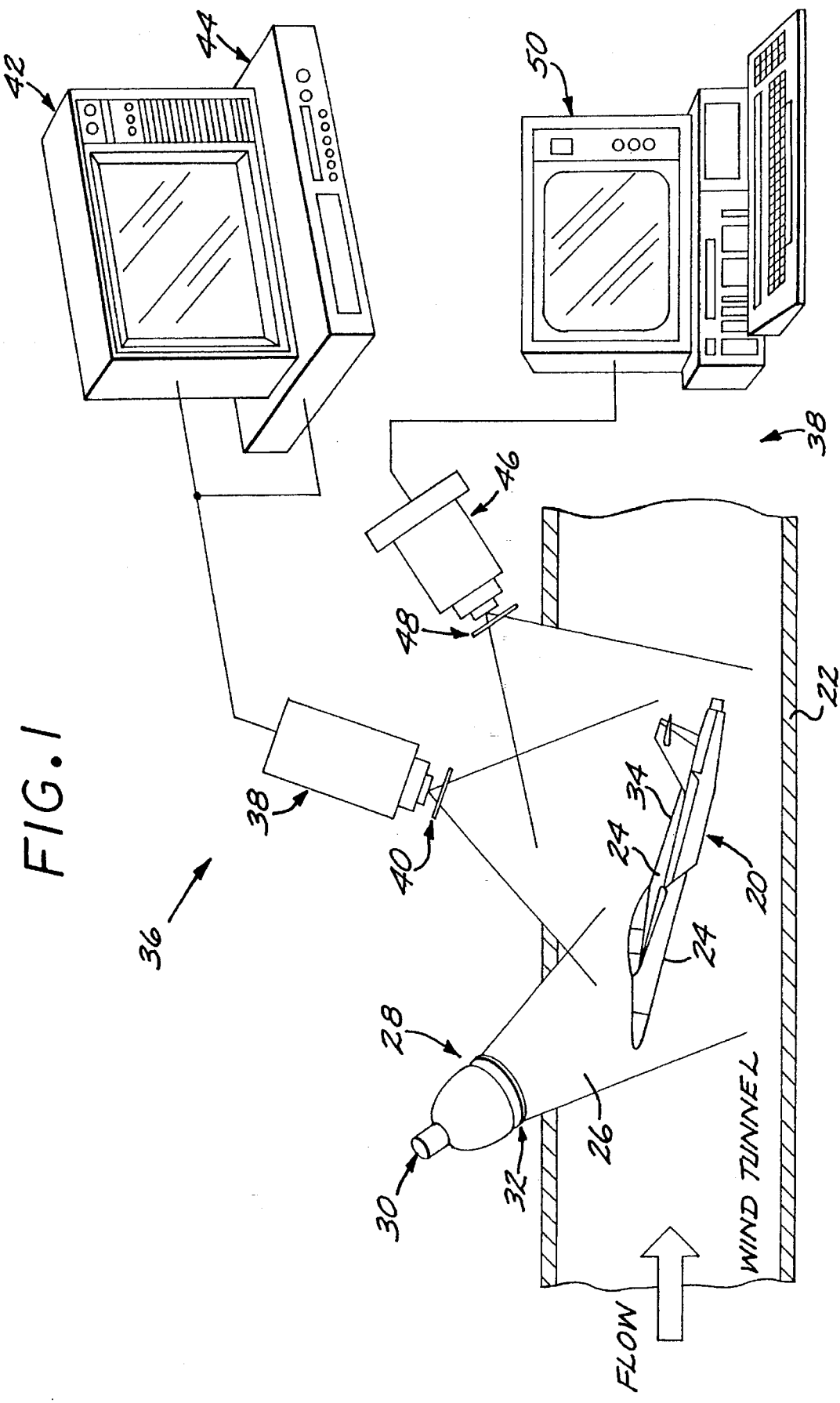
FIG. 1 is a diagrammatic illustration of the testing of an aerodynamic model using a pressure-sensitive paint.

FIG. 1 depicts an aerodynamic structure, in this case an aircraft model 20, which is undergoing testing in an air flow in a wind tunnel 22. The aircraft model 20 is coated with a layer 24 of a pressure-sensitive paint (preferably overlying a primer), whose formulation and mode of application to the model will be discussed in more detail subsequently. The layer 24 is illuminated by a beam 26 of radiation produced by an illumination source 28. The illumination source 28 is preferably a source of blue light, such as a white-light source 30 with a blue filter 32. The beam 26 photoexcites an active agent in that portion of the paint layer 24 lying within an illuminated region 34, with the light output of the active agent responsive to the local surface pressure on the surface of the model.

The illuminated region 34 is viewed by an imaging system 36. One form of the imaging system 36 includes an analog video camera 38 with a yellow filter 40. The video camera 38 includes an internal optical system that focuses the image of the illuminated region 34 onto an imaging photodetector within the video camera 38. The imaging photodetector preferably employs a charge-coupled device (CCD). The video camera 38 images the spatial distribution within the illuminated region 34 of the light intensity emitted from the pressure-sensitive paint layer 24. The image is viewed on a video monitor 42 and recorded on a tape recorder 44. Scanning means can be provided for both the illumination source 28 and the imaging system 36 so that regions over the entire surface of the aircraft model 20 can be viewed and analyzed. The aircraft model 20 may equivalently be viewed by an imaging system 38' including a digital camera 46 viewing the scene through a yellow filter 48. The images of the digital camera 46 are viewed and recorded with a digital computer 50. The illumination source 28 and imaging system 36 are of conventional designs that are known in the art.

FIG. 2 depicts a method for preparing and using the pressure-sensitive paint formulation used to apply the layer 24. For preparation of the paint formulation, three constituents are prepared or furnished: a binder, an active agent, and a solvent for the binder and the active agent.

The binder is prepared, numeral 60, by mixing together from about 96 to about 97.5 percent by weight of silanol-terminated polydimethylsiloxane having a molecular weight of about 18,000 and a viscosity of about 750 cps, and from about 4 to about 2.5 percent by weight of methyltriacetoxysilane. Most preferably, the binder comprises about 97 percent by weight of silanol-terminated polydimethylsiloxane and about 3 percent by weight of methyltriacetoxysilane. The silanol-terminated polydimethylsiloxane has the function of providing the backbone for a tri-dimensional polymer network, and the methyltriacetoxysilane has the function of achieving crosslinking of the polymer structure upon curing. If less than about 2.5 or more than about 4 percent by weight of the silanol-terminated polydimethylsiloxane is used, the paint has a lower pressure sensitivity.

In the preferred case, the silanol-terminated polydimethylsiloxane is present in an amount of about 97 parts by weight and the methyltriacetoxysilane is present in an amount of about 3 parts by weight. The binder mixture is prepared by melting the methyltriacetoxysilane at a temperature of about 60° C. and adding it to the silanol-terminated polydimethylsiloxane. The mixture is stirred vigorously for about 1 minute and transferred to a container. These steps are performed in a controlled-atmosphere chamber wherein moisture is prevented from contacting the formulation by maintaining a 0 percent relative humidity. The container is tightly capped and thereafter shaken and rotated to effect stirring of the contents for 5–10 minutes. The mixture is stored in the capped container overnight at ambient temperature. The capping of the container limits the extent of the polymerization process by preventing contact of the binder material with atmospheric moisture and by preventing the escape of gaseous reaction products, primarily acetic acid.

The organic solvent is provided, numeral 62. The solvent is preferably dichloromethane. The solvent plays two roles. First, it promotes the uniform dispersion of the active agent in the binder, which in turn leads to enhanced sensitivity of the paint. The preferred active agent is not soluble directly in the binder, but it is soluble in the mixture of binder and solvent. Second, the solvent reduces the viscosity of the binder and thus acts as a carrier to enable application of the paint by techniques such as spraying.

The solvent and the binder are mixed, numeral 64, also in the controlled-atmosphere chamber at 0 percent relative humidity to exclude moisture. The amount of solvent used in the formulation depends upon the approach by which the paint is applied. More solvent is used for spraying formulations as compared with brushing formulations. For the preferred spray painting approach, the preferred proportion is from about 70 to about 90 percent by weight of organic solvent (of the total weight of solvent, binder, and active agent) and about 30 to about 10 percent by weight of the binder. (Because the amount of the active agent is small, typically 0.1–0.5 percent by weight of the binder plus active agent in the paint formulation prior to application, from about 30 to about 10 percent by weight of the binder is substantially the same as from about 30 to about 10 percent by weight of the combination of binder and active agent.) Most preferably, the organic solvent is present in an amount of about 80 percent by weight and the binder is present in an amount of about 20 percent by weight. In the preferred approach, the capped container is unsealed in the 0 percent relative humidity environment, a major portion of the solvent is added to the partially reacted binder mixture, and the contents is stirred. The dilution of the partially reacted binder mixture with the solvent substantially halts any further reaction.

The luminescing active agent is furnished, numeral 48. The preferred active agent is tris(4,7-diphenyl-1,10-phenanthroline) ruthenium(II) chloride pentahydrate. This active agent is a known chemical and was synthesized according to the procedure set forth in R. J. Watts and G. A. Crosby, "Spectroscopic Characterization of Complexes of Ruthenium (II) and Iridium (III) with 4,4'-Diphenyl-2,2'-bipyridine and 4,7-Diphenyl-1,10-phenanthroline". *J. Amer. Chem. Soc.*, vol. 93, page 3184 (1971), whose disclosure is incorporated by reference.

Other photoluminescent compounds whose luminescence is quenched by oxygen can be used as active agents as well. Other operable ruthenium-containing compounds such as tris(3,4,7,8)tetramethyl-1,10 phenanthroline) ruthenium(II) chloride hexahydrate, and tris(4,7-diphenyl-1,10-phenanthroline) ruthenium(II) perchlorate pentahydrate can be used. The binder discussed previously has also been used during the development of the present invention with non-ruthenium-containing compounds such as, for example, platinum octaethylporphyrin. This latter combination of the preferred binder and platinum octaethylporphyrin, in the same proportions as discussed previously, results in a pressure-sensitive paint which exhibits high sensitivity, but the luminescence light output is much lower than that of the preferred pressure-sensitive paint discussed previously. Accordingly, the paint is useful only when used at lower pressures. When the luminescence light output of a pressure-sensitive paint is low, the signal-to-noise ratio becomes smaller because the optical system is operated near the limit of detection of the CCD camera.

The active agent is added to the mixture of binder and solvent, numeral 68, in the 0 percent relative humidify environment. In the preferred approach, approximately ¾ of the solvent is mixed with the binder in step 64. The remaining ¼ of the solvent is added to the mix with the active agent in step 68. After all of the constituents are combined, the container is again capped and shaken until all of the active agent dissolves. At this point, the paint preparation is complete, and the capped bottle is stored until the paint is required for application.

It has been the practice to use extenders and/or fillers such as silica gel in photoluminescent paints for barometry, see for example U.S. Pat. No. 5,359,887. Such additions are not needed or desired, and accordingly are not preferred, with the present pressure-sensitive paint formulation.

The pressure-sensitive paint formulation is applied to the surface of the aerodynamic structure, here the aircraft model 20, numeral 70. The surface is first prepared by applying a white base coat primer of a mixture of nine parts GE SS 4044 clear silicone primer and one part DuPont R900 titanium dioxide. See U.S. Pat. No. 5,359,887 for a further discussion of this primer and its use. The pressure-sensitive paint prepared by the steps 60, 62, 64, 66, and 68 is applied by any operable technique that produces a smooth, even final layer 22. The preferred application technique is spraying with a conventional air brush or a spray gun. When the paint is applied with an air brush, the air pressure is preferably about 20 psi (pounds per square inch) and the nozzle of the air brush is held about 3–4 inches from the surface being painted. It is preferred to make 2–4 passes over the surface, to apply the layer in several overlying thin sublayers rather than a single thick layer in one pass.

As the paint is applied or soon thereafter as the paint dries, the solvent evaporates. The paint is cured for an additional period of 3–4 hours to further complete the polymerization and cross-linking reaction of the constituents of the binder. The result is the layer 22 with the paint formulation of cured binder and active agent, overlying the primer. The layer 22 thus preferably includes the primer sublayer adjacent to the substrate and the pressure-sensitive paint sublayer overlying the primer sublayer. The primer sublayer preferably has a thickness of about 10 micrometers, and the pressure-sensitive paint sublayer preferably has a thickness of from about 10 micrometers to about 20 micrometers, most preferably about 15 micrometers.

The aerodynamic surface prepared in the manner described is tested, numeral 52. In a typical procedure, the surface is placed into a wind tunnel. The surface is illuminated and sensed, using the general approach illustrated in FIG. 1, to detect the pressure at locations on the aerodynamic surface.

A batch of the pressure-sensitive paint of the invention was prepared in the following manner. All of the required tools and chemical constituents were placed into a controlled atmosphere, 0 percent relative humidity chamber, in this case a glove box. About 110 grams of silanol-terminated polydimethylsiloxane was placed into a 400 milliliter beaker. About 3.2 grams of methyltriacetoxysilane was heated to 60° C., added to the beaker, and vigorously stirred for about 1 minute. A measure of 108 grams of this binder mixture was rapidly transferred to a 1 pint bottle, which was immediately capped with a hermetically sealing cap. The bottle was shaken and rotated to stir the contents for an additional 5–10 minutes. The reacting mixture was left in the capped bottle overnight to react and equilibrate at ambient temperature. The next day, the bottle and all necessary ingredients were placed in a second glove box at 0 relative humidity and ambient temperature. In a separate bottle, 432 grams of dichloromethane solvent was weighed, and 309 milligrams of tris(4,7-diphenyl-1,10-phenanthroline) ruthenium(II) chloride pentahydrate active agent was placed into a vial and dried for 45 minutes at 55° C. in vacuum. About ¾ of the dichloromethane was added to the bottle with the binder mixture, and the contents were stirred. The active agent was added to the bottle, and the remainder of the dichloromethane was added. The bottle was capped and shaken until the active agent was completely dissolved. The resulting paint was applied to surfaces using an air brush.

Testing of the paint formulation was conducted using an apparatus and approach like that shown in FIG. 1. The above-discussed formulation was applied in a thickness of 10–15 micrometers, and was measured to have a surface roughness of 0.2–0.4 micrometers RMS (root mean square). The paint layer was tough and flexible, with an emission sensitivity (measured as $I_{nitrogen}/I_{air}$) of 14, a relative emission efficiency of 0.3 at 1 atmosphere, and a response time to reach 95% of the equilibrium signal level of 40 milliseconds. For comparison, a second formulation was prepared using the same preferred active agent and the preferred binder of U.S. Pat. No. 5,359,887, prepared in accordance with Example 1 of that patent. When applied in a thickness of 10–15 micrometers, the surface roughness was 0.7–1.0 micrometers. The paint layer was tough and flexible, with an emission sensitivity (measured as $I_{nitrogen}/I_{air}$) of 6, a relative emission efficiency of 0.9 at 1 atmosphere, and a response time to reach 95% of the equilibrium signal level of 40 milliseconds. A third formulation was prepared using the approach of Example 1 of the '887 patent, but with platinum octaethylporphyrin as the active agent. When applied in a thickness of 10–15 micrometers, the surface roughness was 0.2–0.7 micrometers. The paint layer was tough and flexible, with an emission sensitivity (measured as $I_{nitrogen}/I_{air}$) of 45, a low relative emission efficiency of 0.01 at 1 atmosphere, and a response time to reach 95% of the equilibrium signal level of 40 milliseconds. A fourth formulation was prepared with the preferred active agent and an optimized poly[1-(trimethylsilyl)propyne] binder (see Example 3 of the '887 patent). When applied in a thickness of 15–25 micrometers, the surface roughness was greater than 8 micrometers. The paint layer was tough and hard, with an emission sensitivity (measured as $I_{nitrogen}/I_{air}$) of 25, a low relative emission efficiency of 0.04 at 1 atmosphere, and a response time to reach 95% of the equilibrium signal level of 40 milliseconds.

The first formulation, prepared according to the preferred embodiment of the present invention, and the second formulation, prepared according to the '887 patent, both yield good results using the preferred active agent. The present formulation has a smoother surface, which is desirable for minimizing airflow disruption, and a combination of emission properties useful in many circumstances. The prior second formulation produces a slightly less smooth surface, but has emission properties that are useful in other circumstances. The third and fourth formulations produce rougher surfaces and also exhibit low emission efficiencies. Thus, the first formulation results in a superior set of properties where high surface smoothness is most important.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A pressure sensitive paint, comprising in combination a mixture of a photoluminescent-compatible binder comprising a binder mixture of silanol-terminated polydimethylsiloxane and methyltriacetoxysilane, wherein the silanol-terminated polydimethylsiloxane is present in an amount of about 97 parts by weight of the binder, and the methyltriacetoxysilane is present in an amount of about 3 parts by weight of the binder, and a photoluminescent active agent, where the binder is present in an amount of from about 99.5 to about 99.9 percent by weight of the mixture of binder and active agent, and the active agent is present in an amount of from about 0.5 to about 0.1 percent by weight of the mixture of binder and active agent, whereby, when the paint is applied to a surface, oxygen in the air permeates through the binder to partially quench a photoluminescent reaction of the active agent.

2. The pressure sensitive paint of claim 1, wherein the binder is present in an amount of about 99.7 percent by weight of the mixture, and the active agent is present in an amount of about 0.3 percent by weight of the mixture.

3. The pressure sensitive paint of claim 1, wherein the mixture is a rubbery solid wherein the constituents of the binder are chemically reacted together.

4. The pressure sensitive paint of claim 1, wherein the active agent comprises a photoluminescently active material selected from the group consisting of tris(4,7-diphenyl-1,10-phenanthroline) ruthenium(II) chloride pentahydrate, tris(4,7-diphenyl-1,10-phenanthroline) ruthenium(II) perchlorate pentahydrate, tris(3,4,7,8)tetramethyl-1,10phenanthroline)ruthenium(II)chloride hexahydrate, and platinum octaethylporphyrin.

5. The pressure sensitive paint of claim 1, wherein the mixture is a liquid and further comprises
an organic solvent for the binder and the active agent.

6. The pressure sensitive paint of claim 5, wherein the solvent comprises dichloromethane.

7. The pressure sensitive paint of claim 5, wherein the solvent is present in an amount of from about 70 percent to about 90 percent by weight of the total of binder, active agent, and solvent.

8. The pressure sensitive paint of claim 5, wherein the solvent is present in an amount of about 80 percent by weight of the total of binder, active agent, and solvent.

9. The pressure sensitive paint of claim 1, wherein the mixture of binder and active agent contains no extender or filler.

10. A method of conducting a determination of a pressure distribution at a surface of a test model, comprising the steps of applying to the surface of a test model a photoluminescent mixture of
a photoluminescent-compatible binder comprising a mixture of silanol-terminated polydimethylsiloxane and methyltriacetoxysilane, wherein the silanol-terminated polydimethylsiloxane is present in an amount of about 97 parts by weight of the binder, and the methyltriacetoxysilane is present in an amount of about 3 parts by weight of the binder,
a photoluminescent active agent, wherein the binder is present in an amount of from about 99.5 to about 99.9 percent by weight of the mixture of binder and active agent, and the active agent is present in an amount of from about 0.5 to about 0.1 percent by weight of the mixture of binder and active agent, and
a solvent for the binder and the active agent; photo exciting the material on the coated surface, whereupon oxygen in the air permeates through the binder to partially quench a photoluminescent reaction of the active agent; and measuring the luminescence emitted from the surface of the material.

11. The method of claim 10, wherein the step of applying includes the step of supplying an active agent selected from the group consisting of tris(4,7-diphenyl-1,10-phenanthroline) ruthenium(II) chloride pentahydrate, tris(4,7-diphenyl-1,10-phenanthroline) ruthenium(II) perchlorate pentahydrate, tris(3,4,7,8)tetramethyl-1,10phenanthroline)ruthenium(II)chloride hexahydrate, and platinum octaethylporphyrin.

12. The method of claim 10, wherein the step of applying includes the steps of supplying a flowable mixture of the binder, the active agent, and a solvent for the binder and the active agent, spreading the mixture over the surface of the test model, and drying the flowable mixture.

13. The method of claim 10, wherein the step of applying includes the step of providing the photoluminescent mixture wherein the binder and active agent together comprise from about 10 to about 30 percent by weight of the photoluminescent mixture and the organic solvent is present in an amount of from about 70 to about 90 percent by weight of the mixture.

14. The method of claim 10, including an additional step, prior to the step of applying to the surface of a test model a photoluminescent mixture, the step of applying to the surface of the test model a white primer.

15. The method of claim 10, wherein the step of applying includes the step of preparing a photoluminescent mixture by the steps of
mixing together the binder and the solvent, and
mixing the active agent into the mixture of binder and solvent.

16. The method of claim 10, wherein the step of applying includes no step of providing an extender or filler in the photoluminescent mixture.

* * * * *